(12) United States Patent
Sergio et al.

(10) Patent No.: US 7,251,991 B2
(45) Date of Patent: Aug. 7, 2007

(54) METHOD FOR DETERMINATION OF THE PHYSICAL FEATURES OF A TIRE

(75) Inventors: Maximilian Sergio, Sasso Marconi (IT); Nicolò Manaresi, Bologna (IT); Marco Tartagni, Meldola (IT); Roberto Guerrieri, Bologna (IT); Roberto Canegallo, Tortona (IT)

(73) Assignee: STMicroelectronics S. R. L., Agrate Brianza (MI) (IT)

( * ) Notice: Subject to any disclaimer, the term of this patent is extended or adjusted under 35 U.S.C. 154(b) by 124 days.

(21) Appl. No.: 10/969,233

(22) Filed: Oct. 19, 2004

(65) Prior Publication Data
US 2005/0081617 A1    Apr. 21, 2005

(30) Foreign Application Priority Data
Oct. 21, 2003   (EP)   .................... 03425685

(51) Int. Cl.
*G01M 17/02*   (2006.01)
(52) U.S. Cl. ........................................ 73/146
(58) Field of Classification Search ....... 73/146–146.8; 340/442–447
See application file for complete search history.

(56) References Cited
U.S. PATENT DOCUMENTS 4,295,511 A * 10/1981 Mezzanotte et al. ........ 152/555
6,588,472 B2 * 7/2003 Pirotte ..................... 152/209.8
6,630,910 B2 * 10/2003 Forster et al. .............. 343/806
6,729,179 B2 * 5/2004 Crema et al. ................. 73/146
6,734,791 B2 * 5/2004 Kelly et al. ................. 340/445
6,921,197 B2 * 7/2005 Aubel et al. ................ 374/141
6,958,615 B2 * 10/2005 Poulbot et al. ............. 324/661

OTHER PUBLICATIONS

Todoroki, et al. "Wireless strain monitoring using electrical capacitance change of tire: part I—with oscillating circuit," Smart Materials and Structures; May 6, 2003; pp. 403-409; Online, vol. 12; Institute of Physics Publishing: http://ej.iop.org/links/q44/oYwkD6zWohJi0iHY2NR8+w/sm3311.pdf.

* cited by examiner

*Primary Examiner*—Edward Lefkowitz
*Assistant Examiner*—Jermaine Jenkins
(74) *Attorney, Agent, or Firm*—Hogan & Hartson LLP

(57) ABSTRACT

A measurement technique determines the physical features of a tire such as a determination of the deformation a tire undergoes during use. The measurement technique utilizes a first belt, or first and second belts, in the tire reinforced with a plurality of metallic wires and involves the steps of providing a signal between a first and a second metallic wire associated with the first or first and second belts. The measurement technique determines a real part and an imaginary part of the impedance between the first and second metallic wires, which is proportional to the forces acting on the tire.

13 Claims, 2 Drawing Sheets

METHOD FOR DETERMINATION OF THE PHYSICAL FEATURES OF A TIRE

FIELD OF THE INVENTION

The present invention refers to a method for the determination of the physical features of a tire, for example the deformation that it undergoes during use.

BACKGROUND OF THE INVENTION

Recently the safety of the cars has increased due to the installation of various types of sensors and to related electronic control systems. Tires are also under study to avoid wear and possible explosions, which can of course create problems to motor vehicle occupants.

Normally the deformation of the tread is measured by application of sensors to the tires, and measurement systems provide data related to the contact condition of the tire with the road.

A method that uses the structure of the tire as a sensor is described by the article of A. Todoroki, S. Miyatani, and Y. Shimamura, *Wireless Strain Monitoring Using Electrical Capacitance Change Of Tire: Part I With Oscillating Circuit*, Smart Material And Structure, Institute of Physics Publishing, No. 12, pp. 410-16, 2003. The article describes a measurement method of tire deformation that uses the tire steel wires as electrodes of a capacitor. The steel wires are connected to an oscillating circuit of the LC type, and the frequency variations of the oscillator correspond to the variations of the capacitor capacity.

SUMMARY OF THE INVENTION

In view of the state of the art described, it is an object of the present invention to provide a measurement method of the physical features of a tire that has a higher precision and is able to give further information in comparison with the known methods.

According to the present invention, such an object is achieved by means of a method for the determination of the physical features of a tire, said tire comprising at least a first belt reinforced with a plurality of metallic wires, including providing a signal between a first and a second metallic wire and determining the real part and the imaginary part of the impedance between said first metallic wire and said second metallic wire.

According to an embodiment of the present invention, it is possible to get important information from tire resistance variations. By measuring both the capacitance and the resistance of the tire, it is possible to have a better interpretation of tire deformation. According to an embodiment of the present invention, it is possible to carry out the measurements both on the wires of the same belt and on the wires of different belts, in this way interpreting the best obtainable information. The measurement of the resistance combined with that of the capacitance allows a better appraisal of the thickness variations of the belts and as well as those of a single belt.

Two characteristic parameters of the tire are used in an embodiment of the present invention, namely $\varepsilon$ and $\rho$, wherein $\varepsilon$ is the dielectric constant of the rubber in the tire, and $\rho$ is the resistivity of the rubber in the tire. According to the present invention, resistance is related to the temperature assumed by the tire, and therefore by measuring the real part of the tire impedance it is possible to get information on the temperature variation of the tire.

BRIEF DESCRIPTION OF THE DRAWINGS

The features and the advantages of the present invention will be made more evident by the following detailed description of a particular embodiment, illustrated as a non-limiting example in the annexed drawings, wherein.

DETAILED DESCRIPTION

Figure 1:
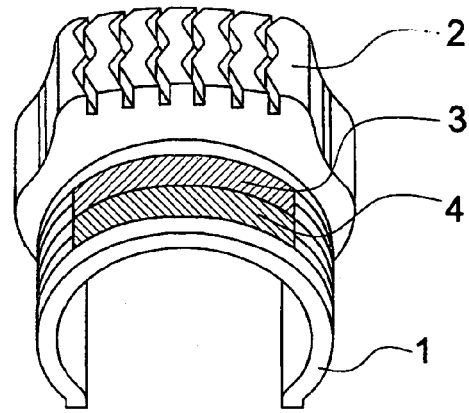
FIG. 1 shows a perspective view of a partial structure of a tire.

A tire, as shown in FIG. 1, comprises a carcass 1 having a toroidal shape including at least a material layer reinforced with wires placed in radial planes and a tread 2 placed above the carcass 1. Between the carcass 1 and the tread 2, two belts 3 and 4 are placed. Every belt includes a reinforced rubber layer with steel wires that are parallel to each other. Belts 3 and 4 have steel wires tilted with respect to the equatorial plane of the tire, normally of about 20°, and they are placed so that the wires of a belt intersect the wires of the other belt. That is, if the wires of a belt are tilted toward the right, the wires of the other belt are tilted toward the left, and therefore they form an angle of about 40° with respect to each other.

The force between the tire and ground can be represented by a vector with two components. One component is perpendicular to the contact surface and one is tangential to the contact surface. The tangential component can subsequently be divided in a parallel component and a perpendicular component with respect to the equatorial plane of the tire.

Figure 2:
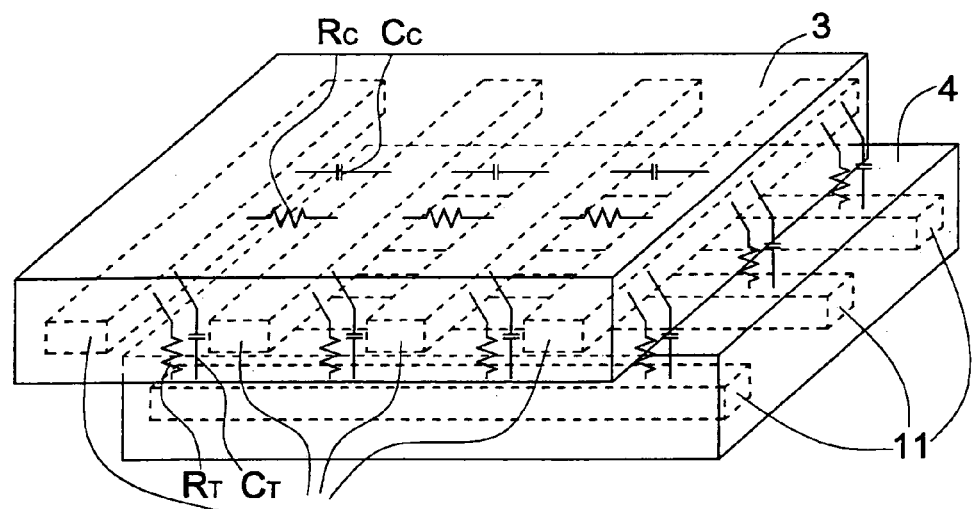
FIG. 2 shows a schematic representation of the tire belts.

Reference is now made to FIG. 2 where belts 3 and 4 are schematically represented. For every belt, the reinforcement wires are shown in schematic form, which in this case form an angle of 90° with each other. Specifically, belt 3 includes wires 10 and belt 4 includes wires 11.

Impedances are represented, composed of a resistance and a capacitor in parallel, between the wires belonging to the two belts as the resistance RT and the capacitor CT and impedances between the wires belonging to the same belt like the resistance RC and the capacitor CC.

Consider, for example, the wires in the same belt. The coupling between the two electrodes, represented by the wires, behaves as a distributed capacitor, while the rubber in the middle behaves as a resistance.

The capacitor can be calculated by the following relation:

$$C = \varepsilon \frac{S}{d}$$

where $\varepsilon$ is the dielectric constant of the rubber, S is the area between the two faced electrodes and d is the distance between the electrodes.

The resistance can be calculated by the following relation:

$$R = \rho d$$

where $\rho$ is the resistivity of the rubber and d is the distance between the electrodes.

When a tire meets an obstacle, the deformation of the tread is transferred to the reinforcement wires of belts 3 and 4. The deformation causes a variation of the space between the wires, and this variation is translated into a variation of the capacitance and resistance values. For example, when the wire lengthens, the distance d increases and the capacitance decreases while the resistance increases.

By measuring the impedance variations it is then possible to determine the tire deformation, and since the movement is proportional to the force, it allows a measure of the forces applied to the tire.

Figure 3:
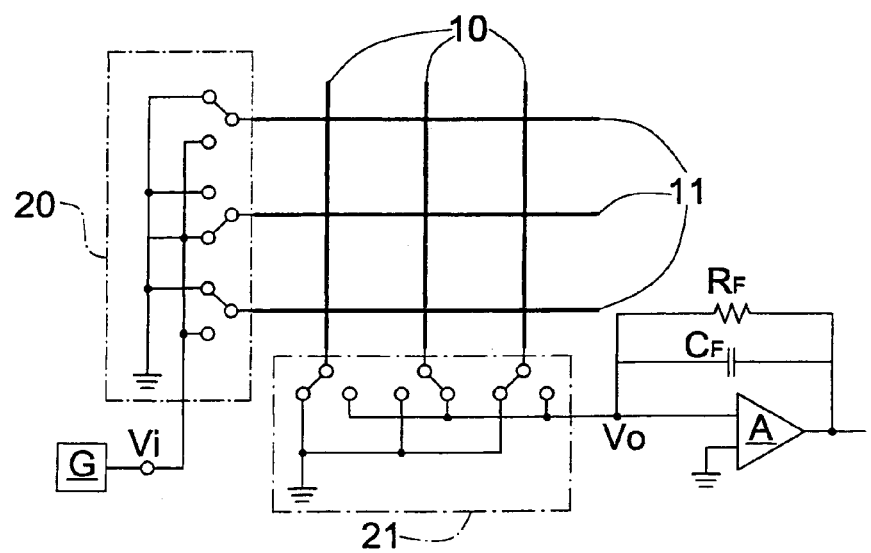
FIG. 3 shows a measurement system of an impedance matrix.

Impedance measurement systems are known in the art, as well as systems to determine, in a particular case, the resistance value and the capacitor value. An example of a measurement system is shown in FIG. 3.

The following description refers to the case in which the impedance is measured between the wires of two belts. A switching system 20 allows the selective application of the signal coming from a generator G to the wires 11 of belt 4. A switching system 21 allows the selective application of a charge amplifier A to the wires 10 of belt 3.

Preferably, the wires to which the signal has not been applied or to those to which the amplifier A is not connected, are connected to ground by switching systems 20 and 21.

The signal received by wires 10 is applied to the non-inverting input of amplifier A, the inverting input is connected to ground, and a capacitor CF and a resistance RF are coupled between the inverting input and the output.

The transfer function of the measuring circuit is the following:

$$\frac{V_0}{V_i}(j\omega) = -\frac{Rf}{Rt}\left(\frac{1 + j\omega R_T C_T}{1 + j\omega R_F C_F}\right)$$

where V0 is the output voltage of wires 10, and Vi is the input voltage.

In a low frequency range, for example of the order of several kHz, $\omega \ll 1/(RTCT)$ and $\omega \ll 1/(RFCF)$ and the preceding relation can be rounded to V0/Vi=−(RF/RT). Therefore, it is possible to determine the resistance value, which is the real part of the impedance.

In a high frequency range, for example of the order of several MHz, $\omega \gg 1/(RTCT)$ and $\omega \gg 1/(RFCF)$ and the preceding relation can be rounded to V0/Vi=−(CT/CF). Therefore it is possible to determine the value of the capacitor, which is the imaginary part of the impedance.

By means of switching systems 20 and 21, all the wires can be scanned and, in this way, a map of the tire mechanical deformation can be created. The mechanical deformation map of the tire is thus formed by sequentially scanning every couple of metallic wires according to the present invention.

Measurements can be made on a tire sample comprising two belts. An electrode is applied to a wire of a belt and another electrode is applied to a wire of the other belt. An LCR impedance meter is used to measure the impedance, and a strain meter is used for measuring the tensile force applied to the sample.

Figure 4:
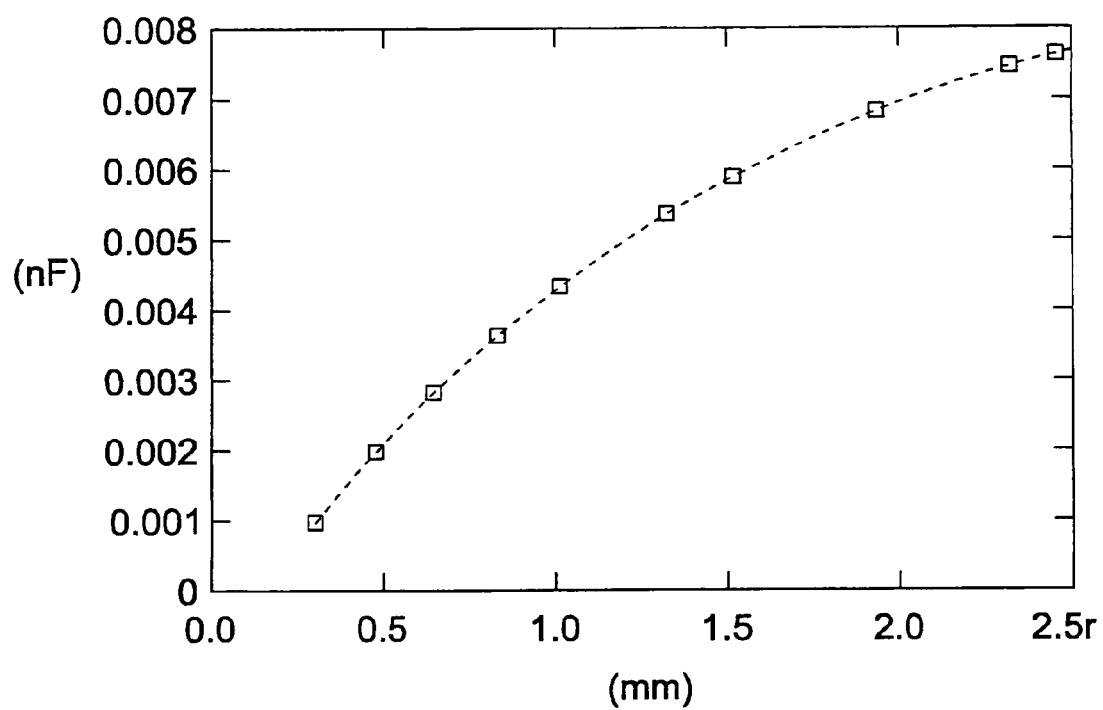
FIG. 4 shows a graph in which the capacitor value variations are represented with respect to a sample deformation.

In FIG. 4 the capacitor value variations with respect to the deformation of the sample are shown. Particularly, on the x-axis the component of the perpendicular force to the equatorial plane of the tire is shown, measured in mm. On the y-axis the corresponding variation of the capacitance is shown, measured in nF.

As the tensile force increases, the thickness of the sample decreases, as well as the distance between the electrodes.

Accordingly the capacitance increases. The increasing capacitance saturates for a tensile force equal to about 2.5 μm due to the presence of tire reinforcement structures.

It has been noticed that a deformation of 0.6% of the linear dimension of the tire causes about a 7% variation in the capacitance.

Another measured tire sample included only a single belt, and therefore the resistance is measured between the electrodes of the same layer of the belt. The tensile force is statically applied between 0 and 3 mm. Because of the linear deformation, the distance between the electrodes increases, the thickness decreases, and the resistance increases. Using a single belt there are no further reinforcement structures of the tire and therefore there is no saturation effect. The results of the measurements are reported in Table 1.

TABLE 1

|  | Extension of the sample of 1 mm | Extension of the sample of 2 mm | Extension of the sample of 3 mm |
| --- | --- | --- | --- |
| Measured resistance (Ω) | 2300 | 2340 | 2380 |

A further tire sample comprising two belts of the type previously used has been measured. Tensile forces are applied for the duration of one second. It has been noticed that the impedance measurement instantly changes with the force application. The impedance measure, therefore, reaches its static value, demonstrating that the relation between the impedance and the tensile force is linear.

While there have been described above the principles of the present invention in conjunction with a preferred embodiment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

The invention claimed is:

1. A method for the determination of the physical features of a tire having a first belt reinforced with a plurality of metallic wires comprising:

providing a signal between a first and a second metallic wire, at least said first metallic wire being associated with said first belt and said second metallic wire being located within said tire;

determining impedance variations between said first metallic wire and said second metallic wire as a result of tire deformation; and converting the impedance variations into a map of the tire.

2. The method of claim 1 wherein said first and second metallic wires are associated with said first belt.

3. The method of claim 1 wherein said tire further comprises a second belt reinforced with a plurality of metallic wires and wherein said first metallic wire is associated with said first belt and said second metallic wire is associated with said second belt.

4. The method according to claim 3 wherein said plurality of metallic wires of said first and second reinforced belt are coupled to ground except for said first and second metallic wires.

5. The method of claim 1 wherein the map is a mechanical deformation map of the tire.

6. The method of claim 5 in which the mechanical deformation map is created by sequentially scanning the metallic wires.

7. A method for the determination of the physical features of a tire having a plurality of metallic wires comprising:
providing a signal between a first and a second metallic wire, wherein at least said first metallic wire is associated with said first belt and said second metallic wire is located within said tire; and
determining the real and imaginary parts of the signal to determine impedance variations between said first metallic wire and said second metallic wire resulting from tire deformation; and
using the impedance variation determinations to produce a map of the tire.

8. The method of claim 7 wherein said first and second metallic wires are associated with a first belt in the tire.

9. The method of claim 7 wherein said first metallic wire is associated with a first belt in the tire and said second metallic wire is associated with a said second belt in the tire.

10. The method according to claim 7 wherein said plurality of metallic wires are coupled to ground except for said first and second metallic wires.

11. The method of claim 7 wherein the map is a mechanical deformation map of the tire.

12. The method of claim 11 in which the mechanical deformation map is created by sequentially scanning the metallic wires.

13. An apparatus for producing a deformation map of a tire possessing a first belt reinforced with a plurality of metallic wires wherein at least a first metallic wire is associated with said first belt and a second metallic wire is located within said tire, the apparatus comprising:
a circuit for successive application of a signal to each of said plurality of metallic wires;
a first device for measuring impedance variations between said first metallic wire and said second metallic wire, wherein said first device measures in parallel resistance and capacitance between said first metallic wire and said second metallic wire and wherein variance in the space between said first metallic wire and said second metallic wire results in impedance variations; and
a second device for converting the impedance variations into a mechanical map of tire deformation.

* * * * *